United States Patent [19]

Hannan

[11] 3,864,680
[45] Feb. 4, 1975

[54] ARRAY ANTENNA FOR RADIATING DOPPLER CODED PATTERN USING PHASE CONTROL

[75] Inventor: Peter W. Hannan, Smithtown, N.Y.
[73] Assignee: Hazeltine Corporation, Greenland, N.Y.
[22] Filed: Apr. 3, 1973
[21] Appl. No.: 347,507

[52] U.S. Cl.... 343/106 D, 343/108 M, 343/113 DE, 343/854
[51] Int. Cl............................................. G01s 1/38
[58] Field of Search..... 343/106 D, 108 M, 100 SA, 343/854

[56] References Cited
UNITED STATES PATENTS

| | | | |
|---|---|---|---|
| 3,704,465 | 11/1972 | Masak et al. | 343/100 SA |
| 3,754,259 | 8/1973 | Redlich | 343/106 D |
| 3,774,222 | 11/1973 | Charlton | 343/113 DE |
| 3,775,773 | 11/1973 | Nemit | 343/108 M |

Primary Examiner—Maynard R. Wilbur
Assistant Examiner—Richard E. Berger

[57] ABSTRACT

Disclosed are array antenna systems for radiating wave energy signals in a Doppler coded pattern. These systems include an array of antenna elements, means for supplying wave energy signals to the elements and means for controlling the phase of the wave energy signals supplied so that wave energy signals radiated by adjacent pairs of elements have a direction of phase reinforcement which is constantly changing and no two pairs of elements in the array have the same direction of phase reinforcement at the same instant of time. The invention may be applied to many array configurations including circular, cylindrical, linear and planar arrays.

16 Claims, 8 Drawing Figures

FRONT VIEW

TOP VIEW

ARRAY ANTENNA FOR RADIATING DOPPLER CODED PATTERN USING PHASE CONTROL

CROSS REFERENCE TO RELATED APPLICATIONS

The present invention relates to antenna systems for radiating frequency coded radiation patterns. Other techniques for radiating these patterns are described in simultaneously filed co-pending U.S. applications Ser. No. 347,506, filed Apr. 3, 1973, entitled "Antenna System For Radiating Doppler Coded Pattern Using Multiple Beam Antenna," and Ser. No. 347,504, filed Apr. 3, 1973, entitle "Circular Array For Radiating Doppler Coded Pattern, Using Sequential Modal Excitation," which are assigned to the same assignee as the present application.

BACKGROUND OF THE INVENTION

This invention relates to antenna systems for use in angular direction finding systems. In particular this invention relates to systems which radiate a pattern of wave energy wherein the frequency of radiation varies with one of the components of angular direction from the antenna system. These systems are known as "Doppler" systems.

Prior antenna systems for radiating Doppler coded patterns have most often achieved these patterns by sequentially coupling wave energy signals to the elements of an array during a selected time period. This technique results in an apparent motion of the active portion of the antenna aperture which causes a Doppler coded pattern to be radiated. Antenna systems using the sequential excitation technique to achieve frequency coded radiation patterns have been described by Masak, et al. in U.S. Pat. No. 3,704,465 and in co-pending application Ser. No. 67,821, filed Aug. 28, 1970, now U.S. Pat. No. 798,645 which are assigned to the same assignee as the present application.

As applied to a circular array, one disadvantage of the sequential excitation technique is that with a circular array not all elements radiate wave energy in all directions within the desired region of space. Consequently, the array does not radiate in those directions during the entire period of sequential excitation resulting in an angle dependent time ambiquity in those directions. Another disadvantage is cost and complexity of sequential switching equipment, particularly if a portion of the array larger than a single column is to be excited at any one time.

Doppler coded radiation patterns can also be produced using phase control of signals supplied to the beam ports of a multiple-beam, multiple-port antenna. This technique is described in the above referenced co-pending application entitled "Antenna System For Radiating Doppler Coded Pattern Using Multiple Beam Antenna." However, the present invention is applicable to array antennas which do not have beam-forming apparatus associated with the antenna elements.

SUMMARY OF THE INVENTION

An object of the present invention, therefore, is to provide an antenna system for radiating a Doppler coded pattern using an array of antenna elements and means for controlling the phase of wave energy supplied to the elements.

A further object of the present invention is to provide such an antenna system using a circular array wherein Doppler coded signals are simultaneously radiated from the antenna in all directions within a desired region of space.

In accordance with the present invention there is provided an antenna system for radiating wave energy signals into a region of space during a selected time period and in a desired radiation pattern. The radiation pattern is one in which the radiated frequency varies with at least one of the components of angular direction from the antenna system. The antenna system includes an array of antenna elements arranged along a predetermined path, for radiating supplied wave energy signals and means for supplying wave energy signals to the elements during the time period. The antenna system also includes means for controlling the phase of the wave energy signals supplied to the elements to produce phase reinforcement of the energy radiated by adjacent elements, in a direction which continuously changes during the time period thereby causing the antenna system to radiate the desired radiation pattern.

DESCRIPTION AND OPERATION OF THE FIG. 1 ANTENNA SYSTEM

Figure 1A:
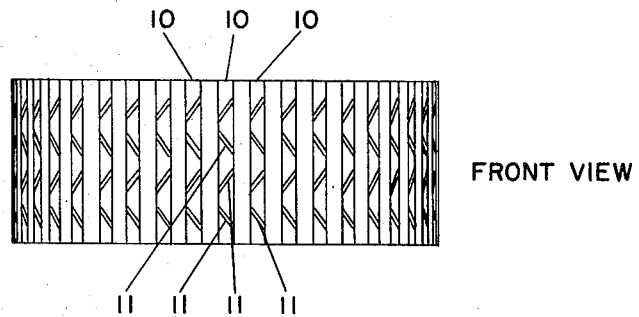
FIGS. 1a and 1b are front and top views, respectively, of an antenna system constructed in accordance with the present invention.
Figure 1B:
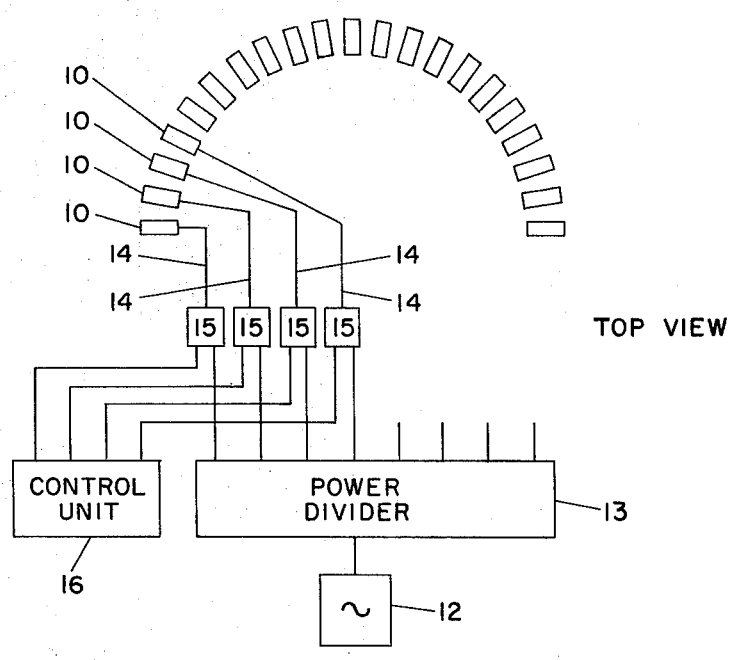

The FIG. 1 antenna system includes an array of waveguide columns 10 which are equally spaced along a circular arc. Each of the waveguide columns 10 has a plurality of antenna elements 11 which in this case are slots cut through the side wall of the waveguide. The antenna system additionally includes a signal generator 12, a power divider 13 and transmission lines 14 for supplying wave energy signals to the columns 10. Phase shifters 15 are provided for individually controlling the phase of wave energy signals supplied to the columns 10. A control unit 16 provides phase control signals to the phase shifters 15.

In the FIG. 1 embodiment antenna elements 11 are slots cut into the side walls of the waveguide columns 10. Slots such as these are commonly uses as antenna elements and are described in "Antenna Engineering Handbook," Henry Jasik, editor, on pages 9–8 to 9–11. The slots are located along the waveguide so that the energy radiated by each of the slots has a desired phase in relation to the energy radiated by other slots in the column. The inclination of the slots is chosen to give the desired amplitude of the energy radiated by each slot. The phase and amplitude of the energy radiated by each of the slots, as well as the number of slots in the column 10, are chosen to give a desired radiation pattern in a plane which includes the axis of the column. The particular relations of these parameters are well known to those skilled in the art.

It will be evident that the columns 10 in FIG. 1 may be constructed so as to have elements other than waveguide slots. Dipoles or small feedhorns are among the conventional element types which may be used. Also, depending on the radiation pattern desired, each column may simply consist of only a single element. Where more than one element is used, suitable means must be provided for coupling wave energy signals of the desired amplitude and phase to all of the elements in a column. These coupling means may include directional couplers, reactive power dividers or other suitable devices.

The transmission lines 14 may be any type suitable for use at the operating frequency chosen for the antenna system. It is important, however, in the FIG. 1 embodiment that these transmission lines have a phase length, in relation to each other, which is appropriate for supplying the wave energy signals to the columns 10 with the required phase in relation to each other as described more fully hereinafter.

The phase shifters 15 may be any type which is appropriate for the chosen frequency of the wave energy signals, such as ferrite phase shifters or diode phase shifters, both of which use phase control signals to vary their apparent electrical length and thereby phase shift the wave energy signals. The phase control signals supplied by the control unit 16 are signals appropriate for controlling the particular phase shifters 15 selected for use in the antenna system. These signals may be digital logic signals or analog signals according to the type of phase shifters selected.

The oscillator 12 may be any suitable generator of wave energy signals at the chosen operating frequency. The power divider may be any of the commonly used types such as couplers, "T" junctions or reactive dividers.

It will be evident that other means may be used to supply wave energy signals having the necessary varying phase in relation to each other. For example, phase control may be performed at a frequency different than the radiated frequency, in which case frequency converting devices would be necessary. Alternatively, a digital or analog frequency synthesis technique can be used to generate the required signals. Phase control may also be achieved by using mixing devices rather than phase shifters.

Operation of the FIG. 1 antenna system is illustrated in FIG. 2. The FIG. 1 antenna has element columns arranged along a circular arc 19, which in this case is 180°. The angular extent of this arc is chosen to be larger than the angle 20 which designates the region of space within which it is desired to radiate a frequency coded (Doppler) pattern. For example, the arc 19 may extend 90° to 120° in excess of the angle 20.

Figure 2A:
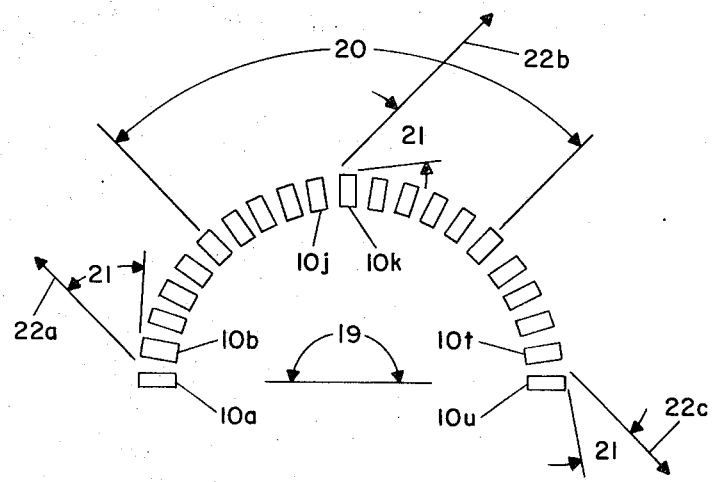
FIGS. 2a, 2b and 2c illustrate the operation of the FIG. 1 antenna.

At the beginning of a selected time period the wave energy signals supplied to any pair of adjacent columns of the antenna will have a phase relation which causes the wave energy signals radiated from the columns to have a direction of phase reinforcement at a particular angle 21 with respect to the orientation of the pair of adjacent columns as shown in FIG. 2a. Because all of the column pairs in the array have different orientations, the wave energy signals will have a different direction of phase reinforcement for each column pair. Signals from any column pair will be radiated in the direction of phase reinforcement. Thus, the signals radiated from the pair of columns 10a and 10b radiate in direction 22a; columns 10j and 10k radiate in direction 22b; and columns 10t and 10u radiate in direction 22c.

Figure 2B:
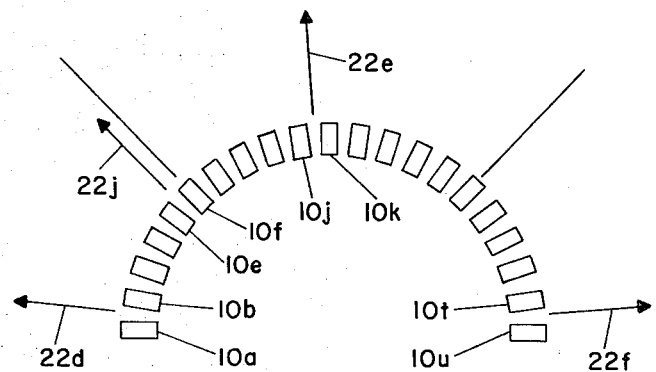

At a later time during the selected time period the phase of the signals supplied to the columns has changed so that all elements have the same phase. The result is that the direction of phase reinforcement and hance radiation from all the column pairs has changed. Thus, signals radiate from pair of columns 10a and 10b in direction 22d; from pair of columns 10j and 10k in direction 22e; and from pair of columns 10t and 10u in direction 22f, as indicated in FIG. 2b.

Figure 2C:
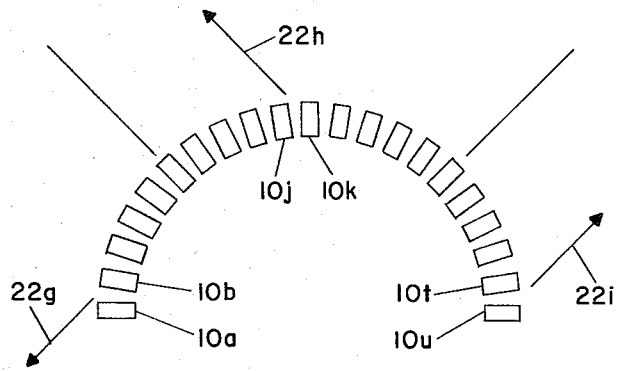

At the end of the selected time period, the phase of the signals has changed to have a phase relation between pairs of adjacent columns which causes the radiation to occur as indicated in FIG. 2c. Columns 10a and and 10b radiate in direction 22g; 10j and 10k, in direction 22h; and 10t and 10u, in direction 22i.

An observer or target in the far field of the antenna in the directtion indicated by 22a in FIG. 2a would receive signals from columns 10a and 10b at the beginning of the selected time period. At a later time during the period the same observer receives signals from columns 10e and 10f since his direction is then indicated as 22j in FIG. 2b. At the end of the period the observer receives signals radiated from columns 10j and 10k since his direction is then indicated as 22h in FIG. 2c. It will be apparent then that the observer receives signals from the antenna which radiate from an apparent source which moves along the circular arc 19 from columns 10a and 10b to columns 10j and 10k during the time period. It should also be noted that all other locations within the desired region of space receive signals from phase centers which move in a similar manner, but have different starting and ending points. Radiation in any particular direction therefore originates from a continuous distinct set of columns.

Figure 3:
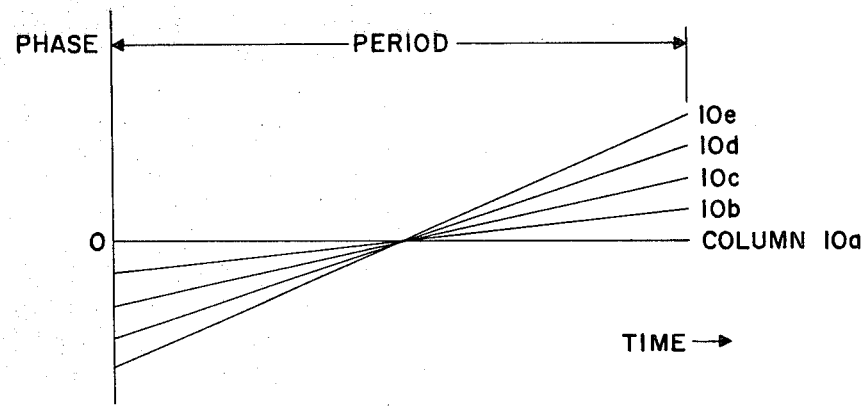
FIG. 3 illustrates the phase of the signals used in the FIG. 1 antenna.

During the selected time period the phase of the wave energy signal supplied to each of the columns, measured with respect to the signal supplied to column 10a, is constantly changing; the rate of phase change of any particular signal being a function of the angular separation of its respective column from column 10a. FIG. 3 illustrates one possible phase variation of the wave energy signals supplied to the first five columns of the FIG. 2 antenna referenced to the phase of the signal supplied to column 10a. The phase slope of each of the signals may be interpreted as a frequency shift of the signal supplied to that particular element. Thus, successive columns radiate signals at higher frequencies.

Since each direction in the desired region of space has a distinct set of columns from which wave energy signals in that direction originate, each direction has associated with it an average frequency of radiation. If the phase variation of the columns is linear as indicated in FIG. 3, the radiation in any direction will have a linear frequency variation over the selected time period with an average value of frequency which is unique to that direction. It is possible to supply wave energy signals to the columns with a non-linear phase variation so that the signals radiated in any direction have a constant frequency during the time period. In this case signals supplied to the columns would have a time varying frequency associated with the non-linear phase variation.

It should also be noted that an observer located in any direction within the desired angular region of space will receive signals during the entire time period. The radiation from the antenna may also be repeated during a succession of such time periods to provide substantially continuous coding within the desired region of space. The time period of radiation need not be the entire time period illustrated in FIG. 3. Signals with appropriate varying phase may be supplied to the antenna over any portion of the time period indicated in FIG. 3 and a frequency coded pattern will be radiated during that period.

The FIG. 1 antenna system constructed with the columns arranged along a circular arc so that the frequency coding in the desired region of space has planar coordinates which are desired for some applications. The coding is such that observers receiving the same average frequency of radiation are in the same plane, such planes being perpendicular to the plane which contains the circular arc. Other embodiments of this invention may use other arrangements of columns of elements or of individual elements.

Other embodiments of this invention may use an array of elements or columns of elements arranged along a linear path. This is possible since the array need not be curved in order to radiate wave energy in different directions from the different element pairs. In a linear array the motion of the apparent source of radiation, as observed from a particular point in space, will be along a straight line. This will cause Doppler coding with conical coordinates, that is, coding such that observers receiving the same average frequency of radiation are in the same cone, such cones having axes coinciding with the straight line.

A further examination of FIG. 2 will show that at certain times during the selected time period some of the columns radiate outside the desired region of space. For example, at the time illustrated in FIG. 2a columns $10t$ and $10u$, among others, radiate in a direction outside the angular region 20. During that portion of the time period wave energy signals need not be supplied to these columns. Similarly, at the end of the time period, illustrated in FIG. 2c, signals need not be supplied to columns $10a$ and $10b$, among others. It will, therefore, be evident that the total amount of wave energy required, and excess radiation in space, will be reduced by supplying wave energy signals to only those columns which radiate into the desired region of space during any particular time in the selected time period.

Other tradeoffs will be recognized by those familiar with antennas for radiating Doppler coded signals and phased arrays. For example, the spacing of the columns may be chosen in accordance with phased array principles so that each pair of columns only radiates in a single direction for any one of the possible phase relations during the time period. The maximum amount of phase difference between adjacent columns determines the excess angular extent of the array beyond the desired coverage angle. The size of the array, total number of elements, and duration of the time period are interrelated and together determine the amount of frequency variation with angle of the radiated signal.

DESCRIPTION AND OPERATION OF FIG. 4 ANTENNA

Figure 4A:
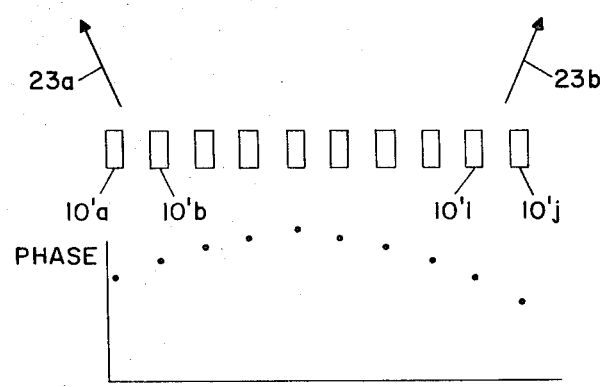
FIGS. 4a and 4b illustrate the operation of another embodiment of an antenna system which embodies the present invention.
Figure 4B:
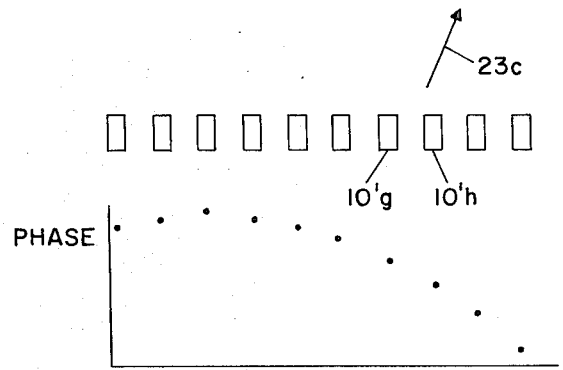

FIGS. 4a and 4b are top views of an array formed of columns 10 similar to the columns used in the FIG. 1 antenna but arranged instead along a linear path rather than a circular arc. The columns of the FIG. 4 array may be supplied with wave energy signals by the same or similar means 12-16, as are used in the FIG. 1 embodiment. FIG. 4a shows the linear arrangement of columns with the associated phase of the wave energy signal supplied to each column at a particular time. The phase relation between adjacent columns causes phase reinforcement of the signals radiated by all pairs of adjacent columns to be in different directions within the desired region of space. Thus, columns $10'a$ and $10'b$ radiate in direction $23a$ and columns $10'$ and $10'j$ radiate in direction $23b$. At a later time, as illustrated in FIG. 4b, columns $10'g$ and $10'h$ radiate in direction $23c$, which is the same as direction $23b$. Thus, the apparent source of radiation has moved in a line along the array. The phase variation of the signals causes an angle dependent frequency variation in the radiated signal. The desired region of space is therefore frequency coded by the array.

Antenna systems constructed in accordance with the present invention may radiate Doppler coded patterns which have either increasing or decreasing frequency with angle, by rearrangement of the signals supplied to the particular elements. Coding in both senses sequentially may be used to eliminate uncertainties in frequency coding caused by any motion of the observer.

In describing the various embodiments above, reference has been made to transmitting antenna systems, but it will be recognized by those skilled in the art that the principles of the present invention can also be applied to receiving antenna systems. Accordingly, the appended claims are intended to be construed as covering both transmitting and receiving antenna systems regardless of the descriptive terms actually used therein.

While there has been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An antenna system for radiating wave energy into a region of space during a time period and in a desired radiation pattern wherein the frequency of said radiated energy within said region varies with at least one of the components of angular direction from said antenna system comprising:

an array of antenna element columns arranged along a predetermined path for radiating supplied wave energy signals, said columns comprising one or more antenna elements and means for coupling supplied wave energy signals to said elements;

means for supplying wave energy signals to said columns curing said time period;

and means for controlling the phase of the individual wave energy signals supplied to each of said columns to produce phase reinforcement of the energy radiated by adjacent columns in a direction which continuously changes during said period, no two pairs of adjacent columns having the same direction of phase reinforcement at any particular time during said period;

thereby causing said antenna system to radiate said desired radiation pattern.

2. An antenna system as specified in claim 1 wherein said predetermined path is linear.

3. An antenna system as specified in claim 2 wherein said wave energy signals are supplied to said columns during a succession of said time periods.

4. An antenna system as specified in claim 2 wherein said phase control means comprises a plurality of phase shifters and a control unit for supplying phase control signals to said phase shifters.

5. An antenna system as specified in claim 2 wherein each of said columns comprises a single element.

6. An antenna system for radiating wave energy into a region of space during a time period and in a desired radiation pattern wherein the frequency of said radiated energy within said region varies with at least one of the components of angular direction from said antenna system comprising:

an array of antenna element columns, arranged along a predetermined curved path, for radiating supplied wave energy signals, said columns comprising one or more antenna elements and means for coupling supplied wave energy signals to said elements;

means for supplying wave energy signals to said columns during said time period;

and means for controlling the phase of the individual wave energy signals supplied to each of said columns to produce phase reinforcement of the energy radiated by adjacent columns in a direction which continuously changes during said period, no two pairs of adjacent columns having the same direction of phase reinforcement at any time during said period;

thereby causing said antenna system to radiate said desired radiation pattern.

7. An antenna system as specified in claim 6 wherein said predetermined curved path is a circular arc.

8. An antenna system as specified in claim 6 wherein said wave energy signals are supplied to said columns during a succession of said time periods.

9. An antenna system as specified in claim 6 wherein said phase control means comprises a plurality of phase shifters and a control unit for supplying phase control signals to said phase shifters.

10. An antenna system as specified in claim 6 wherein each of said columns comprises a single element.

11. An antenna system as specified in claim 6 wherein the wave energy signals supplied to all columns have a particular rate of phase variation for each direction of phase reinforcement of the signals radiated by pairs of adjacent elements.

12. An antenna system for radiating wave energy into a region of space during a time period and in a desired radiation pattern wherein the frequency of said radiated energy within said region varies with at least one of the components of angular direction from said antenna system comprising:

an array of antenna element columns, equally spaced along a circular arc, for radiating supplied wave energy signals, each of said columns comprising one or more antenna elements and means for coupling supplied wave energy signals to said elements;

means for supplying wave energy signals to said columns during said time period;

a plurality of phase shifters for individually controlling the phase of the wave energy signals supplied to each of said columns;

and a control unit for controlling siad phase shifters such that the phase of the wave energy signal supplied to any column is continuously changing during said time period in relation to the phase of the wave energy signals supplied to the adjacent columns and at any time during said time period the wave energy signals supplied to any pair of adjacent columns have the same phase difference as the wave energy signals supplied to any other pair of adjacent columns;

thereby causing said antenna unit to radiate said desired radiation pattern.

13. An antenna system as specified in claim 11 wherein said antenna element columns are slotted waveguides.

14. An antenna system as specified in claim 11 wherein wave energy signals are supplied to some of said columns during only a portion of said time period.

15. An antenna system for radiating wave energy into a region of space during a time period and in a desired radiation pattern wherein the frequency of said radiated energy within said region varies with at least one of the components of angular direction from said antenna system comprising:

a planar array of antenna element columns, arranged along a predetermined path, for radiating supplied wave energy signals, said columns comprising one or more antenna elements and means for coupling wave energy signals to said elements;

means for simultaneously supplying a plurality of wave energy signals during said time period, one to each of said columns;

and means for controlling the phase of the individual wave energy signals supplied to each of said columns to produce phase reinforcement of the energy radiated by adjacent columns in a direction which continuously changes during said period, no two pairs of adjacent elements having the same direction of phase reinforcement at any time during said period;

thereby causing said antenna system to radiate said desired radiation pattern.

16. An antenna system for radiating wave energy into a region of space during a time period in a desired radiation pattern wherein the frequency of said radiated energy within said region varies with at least one of the components of angular direction to said antenna system comprising:

a planar array of antenna element columns, equally spaced along a predetermined path, for radiating supplied wave energy signals, said columns comprising one or more antenna elements and means for coupling wave energy to said elements;

means for simultaneously supplying a plurality of wave energy signals during said time period, one to each of said columns;

a number of phase shifters, equal to the number of said columns of elements, for controlling the phase of the individual wave energy signals supplied to each of said columns;

and a control unit for controlling said phase shifters such that the phase of the wave energy signals supplied to any column is constantly changing during said time period in relation to the phase of the wave energy signals supplied to the adjacent column and signals supplied to no two pairs of adjacent columns simultaneously have the same phase relation at any particular time during said period;

thereby causing said antenna system to radiate said desired radiation pattern.

* * * * *